July 7, 1925.
A. S. GREENBERG
WINDSHIELD CLEANER
Filed June 2, 1924
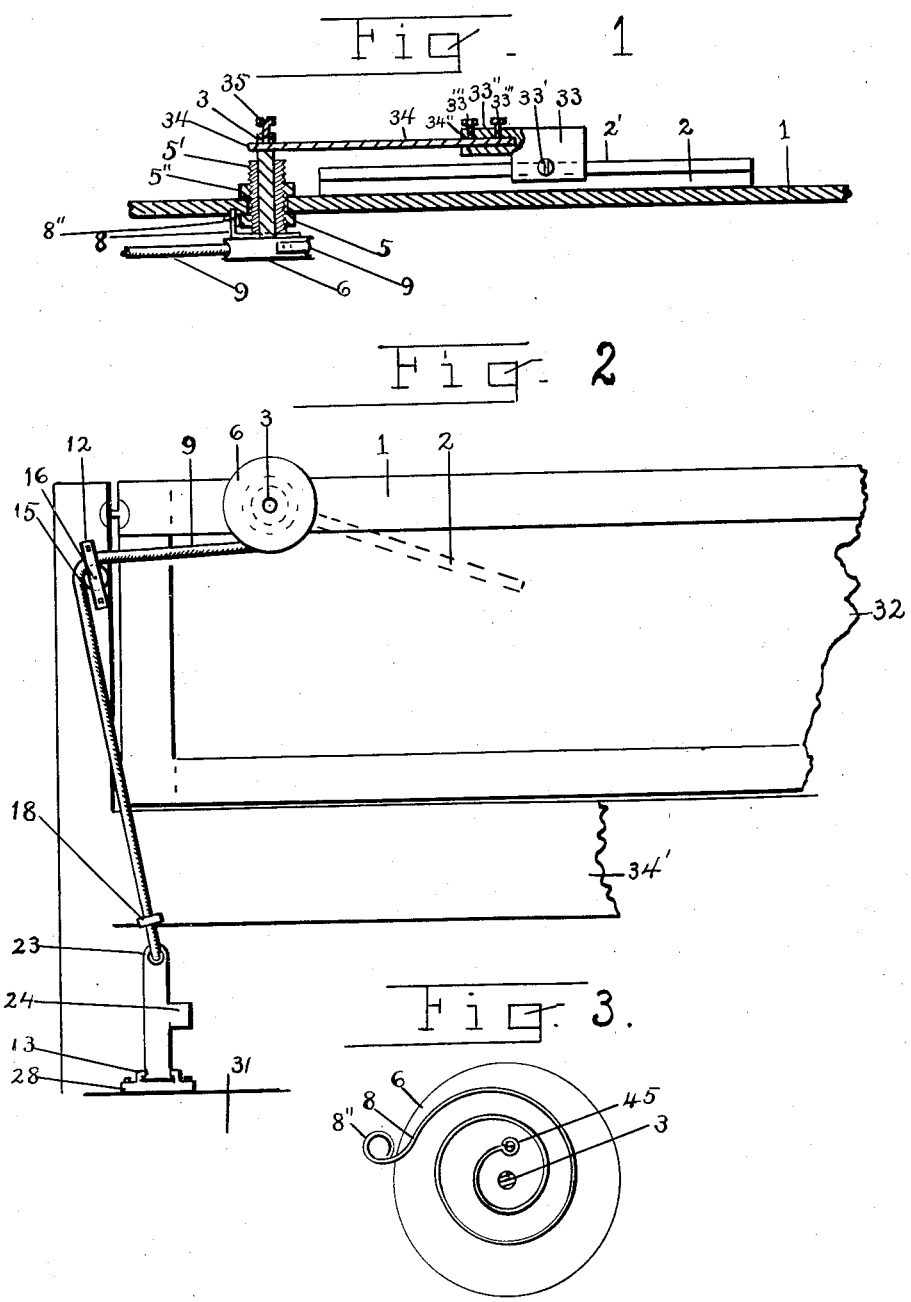
INVENTOR.
Arthur Samuel Greenberg
BY Albert Rosenberg
ATTORNEY.

Patented July 7, 1925.

1,544,835

UNITED STATES PATENT OFFICE.

ARTHUR SAMUEL GREENBERG, OF BALTIMORE, MARYLAND.

WINDSHIELD CLEANER.

Application filed June 2, 1924. Serial No. 717,320.

*To all whom it may concern:*

Be it known that I, ARTHUR SAMUEL GREENBERG, a citizen of the United States of America, and resident of Baltimore city, in the State of Maryland, whose post-office address is 2419 North Dennison Street, have invented new and useful Improvements in Windshield Cleaners, of which the following is a specification.

My invention relates to windshield cleaners for window panes or screens employed as wind shields on automobiles or other vehicles, the purpose of which is to clean the windshield of mist, rain, snow, frost, etc., in order to maintain a clear view through the windshield.

The objects of my invention are first to provide a new article of manufacture; second to provide a more conveniently operated cleaner for windshields; third to provide a windshield cleaner that can be operated by the foot, so as to always leave the hands of the operator free for other uses; fourth, to provide a windshield cleaner which can form a part of the permanent equipment of a vehicle and which can be easily repaired; fifth, to provide a windshield cleaner with a treadle for operating it, directly connected to the windshield cleaner by a flexible connection together with means for maintaining the treadle and the cleaner in a normal position ready for use; sixth, to provide a windshield cleaner with a flexible connection for operating it together with a clamping pulley and guide for the flexible connection; seventh, to provide a windshield cleaner having a flexible connection for operating it, with a pulley having an adjustable guide for the flexible connection; eighth, to provide a windshield cleaner having a flexible connection for operating it, with a pulley having a detachable guide for the flexible connection.

To these objects and other aims hereinafter set forth, my invention consists of a windshield cleaner comprising a wiper arm adapted to be arranged outside of the glass of the windshield and having a spindle extend through and rotatable in a hole provided through the frame of the windshield and to project inside of the said frame and to be connected by suitable means for operating it and to means for turning it back to its normal position automatically. A squeegee or piece of flexible rubber is mounted in the usual way to one of the edges of the wiper arm and means are provided for clamping it in its operative position.

The flexible connection is made to pass over revolving pulleys, and between the face of the pulleys and guides held by the pulley supports, to prevent the flexible connection from leaving the pulleys.

My invention further comprises the improvements to be described and claimed herein.

The accompanying drawings show—

Fig. 1 is a view in section showing the manner of mounting the cleaner.

Fig. 2 is a front elevation of my windshield cleaner showing the flexible connection to the treadle.

Fig. 3 is a spring secured to the pulley to normally hold it and the cleaning means in an operative position.

Referring to the drawings,—

The numeral 1 is the frame around the glass 32 of a windshield in which is rockably mounted the windshield cleaner 2, comprising the squeegee or wiper (the cleaning means) 2 secured in the squeegee frame 2′ which is secured in the squeegee clamp 33 by the screw 33′.

This squeegee clamp 33 is provided with a socket 33″ in which is secured the rod 34 by suitable means 33‴ in the hole 34″ of the socket 33″, but may be held in position by any other suitable means such as soldering or brazing, etc.

To this rod 34 is secured the spindle or shaft 3, preferably by inserting the rod 34 in a hole made diametrically through the shaft 3 and securing the rod 34 by a screw 35 threaded into the end of the shaft 3 which rocks or oscillates in its bearing bushing 5′ onto which are threaded the nuts 5 and 5″ which secure the bearing bushing 5′ at its proper adjustment in the frame 1 of the windshield.

Secured to the spindle 3 at its end opposite the cleaning means, is the pulley 6 by suitable means or made integral with the spindle 3.

Between the pulley 6 and the windshield frame 1 is placed the spring 8 one end 45 of which is secured to the pulley 6 and the other end 8″ is secured to the windshield frame 1 or suitably held thereto by suitable means to keep the spring from bodily turning.

This pulley 6 is preferably made with a grooved rim in which is preferably secured by suitable means a round belt or cord 9 at one of its ends, and passing this belt 9 over a guide pulley 15 pivoted in its bracket 12 by the pin 16 and passing through the guide eye 18 on the dashboard 34' is secured by suitable means to the end 23 of the treadle 24 hinged in the bracket 28 suitably secured to the floor 31 of a vehicle.

It can be seen that my device can readily be attached to any vehicle having windows or windshields, since the requirements are to make only one hole in the windshield frame for the rocking shaft bearing and fastening places for the guide means for the belt.

The guides may be positioned at suitable places according to the type of the vehicle when the windshield cleaner is installed.

It will be seen that the shaft or spindle 3 can be adjusted transversely of the windshield frame by adjusting the bearing in the frame and that this adjustment provides the means for maintaining the proper pressure of the squeegee or cleaning means against the glass of the windshield. No bearing detachably secured in a windshield frame has been used prior to my invention.

It is common practice to make the windshields of automobiles with means for adjustably mounting them in automobiles' bodies, and I provide a hole in the upper part or rail of the frame of the windshield frame in which I insert the bearing for my cleaner, and when the said windshield frame is adjusted to different angles in the automobile body, the bearing is moved in the same positions to always maintain the same angle as the frame of the windshield frame.

I am aware that there has been stationary frames of windows provided with bearings for windshield cleaners, but no one has provided an adjustable frame of a windshield with a bearing for a windshield prior to my invention thereof.

Claims:

1. In a windshield cleaner, a tubular bearing adapted to be adjustably mounted in an opening transversely through the windshield frame for axial movement, a rocking shaft journaled in said bearing, a wiper carried by said shaft, means rigid with said shaft and abutting against said bearing, whereby said shaft is moved axially upon the adjustment of said bearing, and means for rocking said shaft.

2. A windshield cleaner comprising a bearing provided with means for mounting it in an opening through a windshield frame, said bearing comprising an externally threaded tube, nuts threaded and engaging the threaded portions of the tube to clamp the windshield frame about the said opening and for relative adjustment to adjust the bearing axially, a rocking shaft journaled in said bearing, a wiper carried by said shaft, means rigid with said shaft and abutting against the said bearing, whereby the said shaft is moved axially upon the adjustment of the bearing and means for rocking the said shaft.

ARTHUR SAMUEL GREENBERG.